United States Patent [19]
Engel et al.

[11] Patent Number: 5,137,308
[45] Date of Patent: Aug. 11, 1992

[54] AIR TRANSFER SYSTEM

[75] Inventors: Donald F. Engel, Prior Lake; Steven S. Gieseke, Richfield, both of Minn.

[73] Assignee: Donaldson Company, Inc., Minneapolis, Minn.

[21] Appl. No.: 557,982

[22] Filed: Jul. 26, 1990

Related U.S. Application Data

[63] Continuation-in-part of Ser. No. 484,161, Feb. 23, 1990, which is a continuation-in-part of Ser. No. 186,585, Apr. 27, 1988, Pat. No. 4,856,826.

[51] Int. Cl.$^5$ ............................................. F16L 49/02
[52] U.S. Cl. .................................... 285/231; 285/420
[58] Field of Search ............... 285/231, 232, 367, 410, 285/420

[56] References Cited

U.S. PATENT DOCUMENTS

| | | |
|---|---|---|
| 237,324 | 2/1881 | Reynolds . |
| 981,705 | 1/1911 | Spinier . |
| 1,808,066 | 6/1931 | Plumner . |
| 1,830,782 | 11/1931 | Burnish et al. ................ 285/367 X |
| 1,848,198 | 3/1932 | Reid ................................ 285/231 |
| 1,985,325 | 12/1934 | Nathan . |
| 2,269,664 | 1/1942 | Hallerberg ..................... 285/367 X |
| 2,985,469 | 5/1961 | Bowman, Jr. . |
| 3,217,400 | 11/1965 | Illesy et al. . |
| 3,325,174 | 6/1967 | Weaver . |
| 3,432,189 | 3/1969 | Buller ............................. 285/232 |
| 3,684,317 | 8/1972 | Kazienko et al. . |
| 3,724,878 | 4/1973 | Ford ............................... 285/367 X |
| 3,726,547 | 4/1973 | Cox, Jr. . |
| 3,794,360 | 2/1974 | Bachle et al. ................... 285/367 X |
| 3,865,413 | 2/1975 | Mizusawa et al. ............. 285/367 |
| 3,891,224 | 6/1975 | Ditcher . |
| 3,964,773 | 6/1976 | Stade et al. .................... 285/367 |
| 3,998,478 | 12/1976 | Zopfi . |
| 4,127,290 | 11/1978 | Mutschlechner . |
| 4,133,563 | 1/1979 | Yanazasi . |
| 4,143,884 | 3/1979 | Nicholas et al. .............. 285/231 X |
| 4,226,446 | 10/1980 | Burringham . |
| 4,378,945 | 4/1983 | Fautenas . |
| 4,379,559 | 4/1983 | Pohman . |
| 4,453,746 | 6/1984 | Keenan . |
| 4,542,922 | 9/1985 | Grossauer . |
| 4,565,381 | 1/1986 | Joelson ......................... 285/231 X |
| 4,664,424 | 5/1987 | Smith . |
| 4,723,796 | 2/1988 | Nattel . |
| 4,754,994 | 7/1988 | Melzer et al. . |
| 4,763,932 | 8/1988 | Matz et al. . |
| 4,856,826 | 8/1989 | Engel et al. . |

FOREIGN PATENT DOCUMENTS

| | | |
|---|---|---|
| 2225406 | 11/1973 | Fed. Rep. of Germany ...... 285/231 |
| 2078457 | 2/1971 | France . |
| 2324886 | 9/1976 | France . |
| 0304537 | 12/1936 | Italy ................................ 285/231 |
| 0309348 | 3/1969 | Sweden ........................... 285/231 |
| 546199 | 9/1942 | United Kingdom . |
| 576081 | 3/1946 | United Kingdom . |
| 2016627 | 9/1979 | United Kingdom ............ 285/367 |
| 2045883 | 6/1985 | United Kingdom . |

*Primary Examiner*—Dave W. Arola
*Attorney, Agent, or Firm*—Merchant, Gould, Smith, Edell, Welter & Schmidt

[57] ABSTRACT

An air flow conduit system is presented for air flow communicatoin between an air filter mechanism and an engine intake manifold. The conduit system comprises substantially rigid straight conduit members joined in fluid communication by connector systems having elbow-shaped conduit members. A narrow end of a conduit member is received within a broad end of a next adjacent conduit member. Sealing engagement occurs by means of an elastomeric seal member having ribs thereon positioned radially between the inner and outer conduits. A preferred rib arrangement is provided, to insure a flexible, multipoint, sea: system.

10 Claims, 5 Drawing Sheets

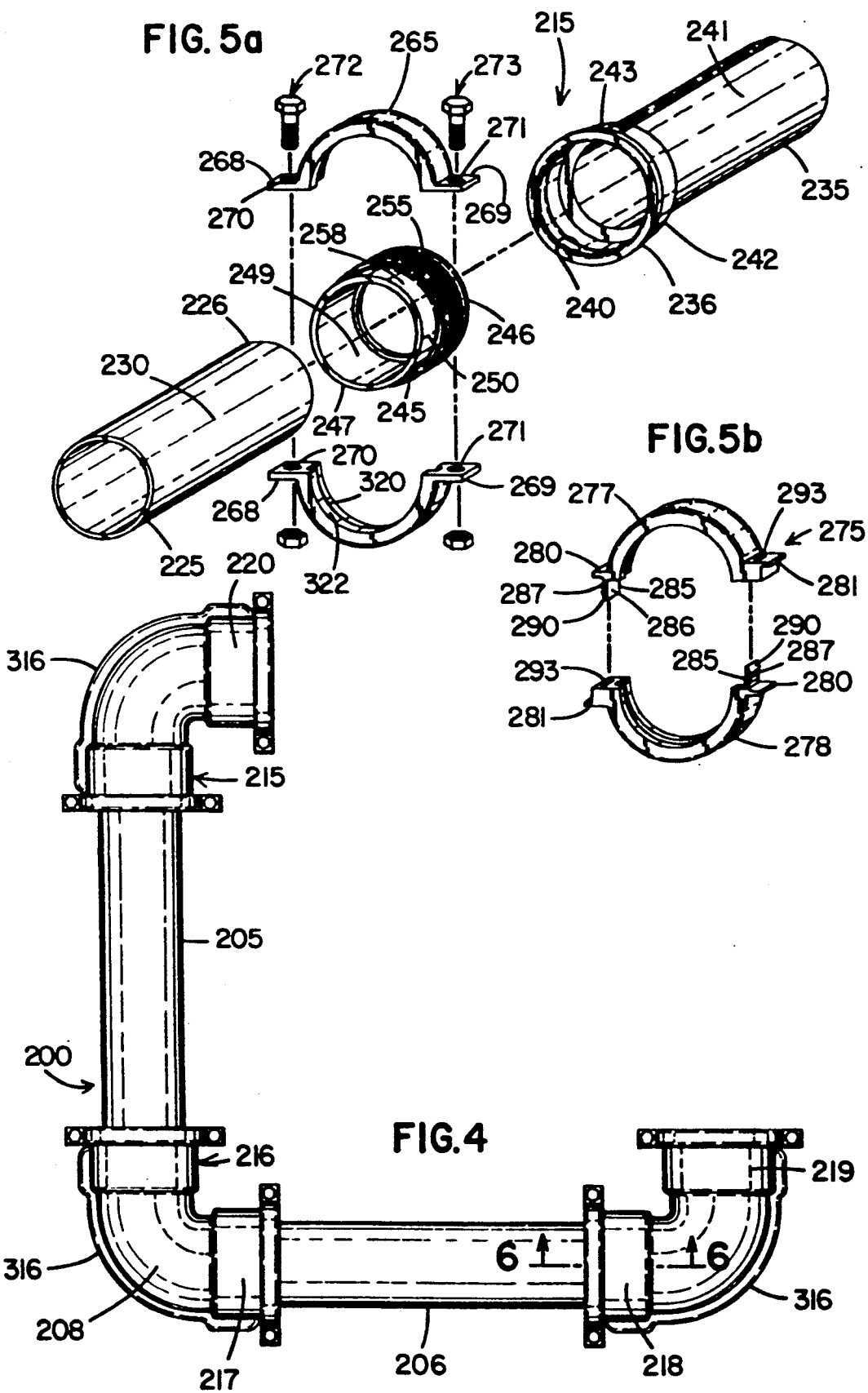

AIR TRANSFER SYSTEM

CROSS-REFERENCE TO RELATED APPLICATION

The present application is a Continuation-In-Part application of U.S. Ser. No. 07/484,161, filed Feb. 23, 1990. U.S. Ser. No. 07/484,161 is itself a Continuation-in-Part application of U.S. Ser. No. 07/186,585, filed Apr. 27, 1988, now issued as U.S. Pat. No. 4,856,826, issued to Engel et al. on Aug. 15, 1989. The teachings of these two applications are incorporated herein by reference.

FIELD OF THE INVENTION

The present invention relates to air-transfer systems. In particular, the invention concerns air-transfer systems having two or more conduit sections for the passage of air between an air-filter arrangement and an intake manifold system or turbo of an internal combustion engine. More specifically, the invention concerns joints between adjacent conduit sections.

BACKGROUND OF THE INVENTION

As described in U.S. Pat. No. 4,856,826 to Engel et al., internal-combustion engines require air or oxygen for operation. This air is typically filtered through a filter arrangement before entering the air intake manifold of the engine. Conduit systems consisting of a number of separate conduits connected together in series are used to channel the air from the filter to the engine.

A conventional arrangement for a conduit system and for joints in a conventional conduit system are shown in FIGS. 2 and 3. Referring to FIG. 2, reference numeral 1 generally designates a conventional conduit system providing for communication between an air filter assembly 3 and an air-intake manifold 4 of an engine. The positioning of the filter assembly 3 relative to the intake manifold 4 is intended to be representational only, and systems may vary.

Typically, the air filter assembly 3 has an exit port 7 thereon, through which air is directed into conduit system 1. Similarly, manifold 4 has a corresponding inlet port 8.

Very often, the exit port 7 and inlet port 8 are oriented skewed with respect to one another, and in different planes. This is suggested by FIG. 2. As a result, generally several conduit sections in series are necessary in order to provide air flow communication between the exit port 7 and the inlet port 8. In the embodiment of FIG. 2, these conduit sections are indicated at sections 10, 11, 12, 13, 14.

Adjacent conduit sections are connected at critical joints 15 by a clamping arrangement 20. One such conventional clamp 20 is shown in FIG. 3. Elongate tube 13 is shown having a circumferential bead 30 thereon. Hose 10 is sufficiently flexible so it can be forced over the bead 30. A conventional hose clamp 31 or the like, positioned around a portion 32 of hose 10 pushed over bead 30, provides for a relatively secure engagement.

Problems with the arrangement of FIGS. 2 and 3 are described in U.S. Pat. No. 4,856,826. In brief, these include: 1) difficulty in assembling the systems in tight quarters; 2) stress or strain on various joints as conventional clamping arrangements are tightened about the joints; 3) air flow obstruction at the joint; 4) failure of the joint under extreme loads and over wide temperature variations and/or pressure fluxes. These problems are addressed by arrangements such as those shown in U.S. Ser. No. 07/484,161, and U.S. Pat. No. 4,856,826.

There remain, however, problems with these arrangements. For instance, the arrangement of 07/484,161 provides relatively little resistance to longitudinal or axial movement of adjacent conduit sections with respect to each other. Further, the clamping of the elastomeric seal member, about the portion of the member that creates the seal, results in stressing of the end of the outer tubular member around the seal, which ultimately may reduce the effective life of the joint. That is, because the outer member will be continually stressed under the clamp, it may tend to lose its resiliency and/or break, thereby detrimentally affecting the joint. Still further, the arrangements in these prior disclosures extend over a substantial axial length.

What has been needed is an arrangement which generally avoids the previous concerns and which is relatively easy to assemble and put into place. In particular, an arrangement has been needed that prevents longitudinal movement of adjacent conduits without unduly stressing the resilient seal member.

OBJECTS OF THE INVENTION

Therefore, the objects of the present invention, in addition to the objects described in U.S. Pat. No. 4,856,826, include: providing a joint arrangement wherein the joint provides resistance against substantial longitudinal movement between the conduit sections while still allowing for flexibility between the conduit members; and providing such a joint that reduces the stress at the ends of the tubular member.

Other objects and advantages will become apparent from the following descriptions, taken in connection with the accompanying drawings, wherein are set forth by way of illustration and example certain embodiments of the present invention.

SUMMARY OF THE INVENTION

The present invention concerns a conduit system providing for air flow communication between an air filter arrangement or the like and an intake manifold in an engine assembly. Generally, the arrangement is useable in almost any internal combustion engine arrangement, including mobile vehicles such as trucks, construction equipment and agricultural equipment. Also, the system may be used in stationary engine arrangements such as power generators and compressors.

Each critical joint is rotationally adjustable. As a result of both rotational and longitudinal adjustability, an overall nearly universal arrangement is provided.

Critical joints between conduit sections are of a preferred, advantageous construction. Each critical joint involves insertion of a narrow section into a broader section.

In one embodiment, the outer surface of the narrow conduit is generally smooth, i.e., does not have ribs thereon, but the soft section or resilient seal member has an outer surface with ribs thereon. The mating broader conduit section fits over the narrow conduit with the resilient seal member positioned therebetween. The inner surface of the broader conduit section engages and deforms the resilient ribs to provide a secure, sealed engagement.

Additionally, the joint includes a clamping arrangement adapted to engage the end of the broader conduit section and to circumscribe the end of the resilient seal member to inhibit longitudinal or axial movement or displacement of the narrow conduit with respect to the broader conduit.

BRIEF DESCRIPTION OF THE DRAWINGS

In the drawings, in which like reference numerals indicate corresponding parts through several views.

FIG. 4 is a plan view of an air conduit system according to an embodiment of the present invention;

FIG. 5 is an enlarged, exploded, fragmentary perspective view of the air conduit system shown in FIG. 4;

FIG. 5b is an enlarged, exploded, plan view of an alternate clamp for incorporation in an air conduit system as shown in FIGS. 4 and 5;

DETAILED DESCRIPTION OF THE PREFERRED EMBODIMENTS

As required, detailed embodiments of the present invention are disclosed herein. However, it is to be understood that the disclosed embodiments are merely exemplary of the invention, which may be embodied in various forms. Therefore, specific structural and functional details disclosed herein are not to be interpreted as limiting, but rather as a basis for the claims and as a representative basis for teaching one skilled in the art to variously employ the present invention in virtually any appropriately detailed structure.

Figure 2:
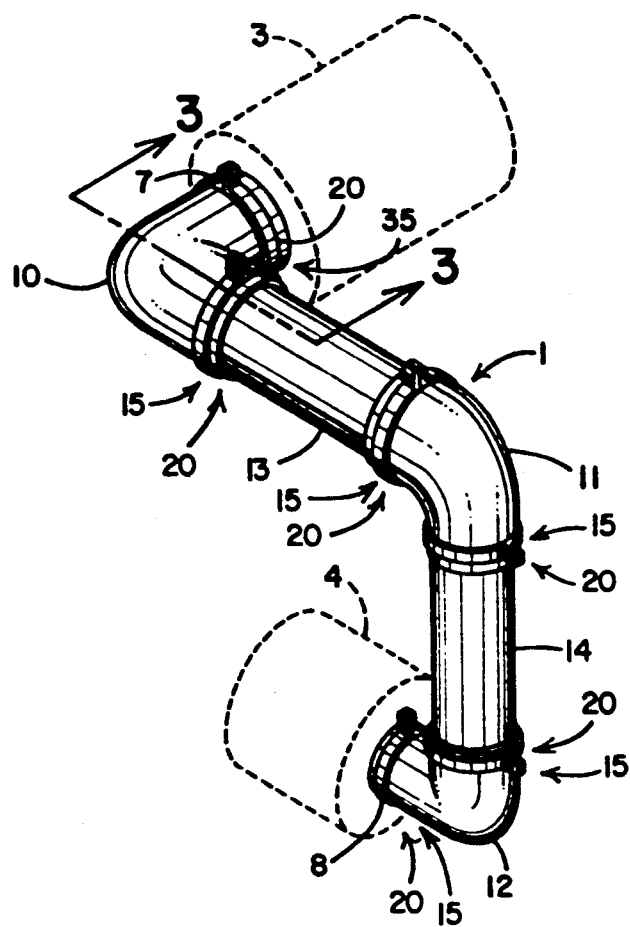
FIG. 2 is a perspective view of a prior-art air conduit system.
Figure 3:
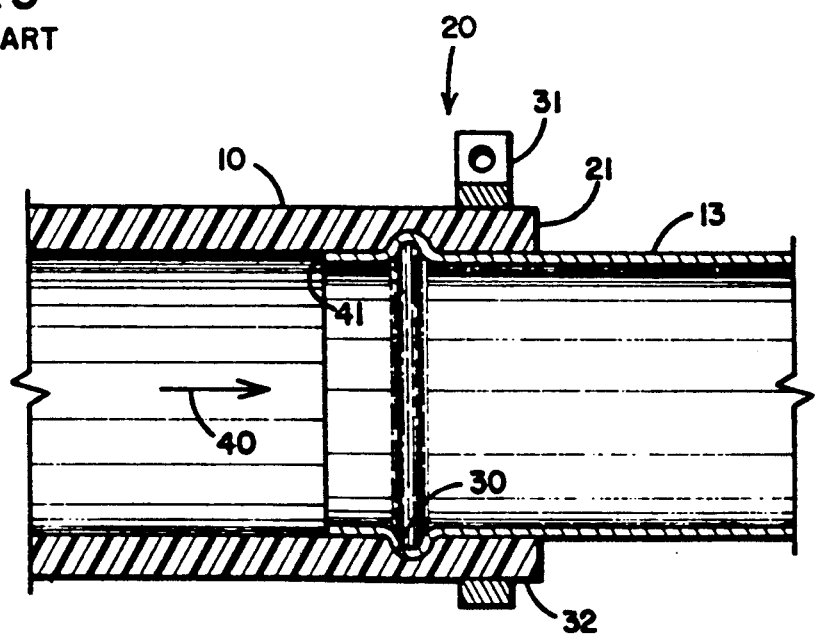
FIG. 3 is an enlarged, fragmentary, cross-sectional view of a prior art conduit system taken generally along line 3—3, FIG. 2.

It is first noted that detailed descriptions of FIGS. 2 and 3, a conventional arrangement, have already been provided.

Figure 1:
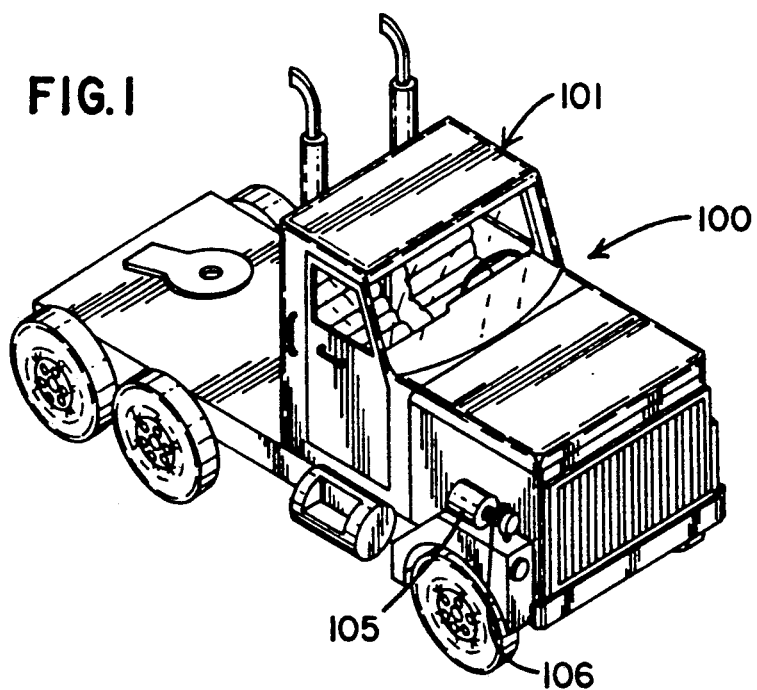
FIG. 1 is a perspective view of a diesel tractor such as may utilize an air conduit system according to the present invention.

Referring to FIG. 1, reference numeral 100 generally represents a typical mechanical embodiment of a system that uses the present invention. Specifically, embodiment 100 comprises a semi-tractor 101, such as a diesel tractor. The tractor 101 may be of the conventional type. The tractor 101 includes an engine, not shown, and an air filter assembly 105. Air passing through the air filter 105 is directed into an engine manifold, not shown, by means of conduit system 106. Conduit system 106 is preferably of the improved, advantageous type according to the present invention, detailed in FIG. 4.

It is to be understood that tractor 101 is representative only of an embodiment for use with the conduit system according to the present invention. Generally, in many arrangements wherein air must pass from an air filter arrangement to an engine manifold, a conduit system according to the present invention may be utilized to advantage. This will be readily apparent, from the following descriptions.

FIGS. 4–10 relate to a mechanical embodiment of a conduit system according to the present invention. This conduit system is generally represented by reference numeral 200 in FIG. 4. Conduit system 200 allows fluid communication between an air filter assembly (not shown) and an engine intake manifold (not shown). Conduit system 200 generally includes a plurality of straight tubular portions connected to one another by elbow portions. In the embodiment shown in FIG. 4, conduit system 200 includes two straight tubular members 205 and 206 joined to one another in fluid communication via elbow, or bend, tubular member 208. Additional elbow tubular members, or bends, engage straight tubular members 205 and 206, such that one end of conduit system 200 can engage the air filter system and the opposite end of conduit system 200 can engage the air intake manifold of the engine.

It should be noted that the elbow members are typically constructed from a sheet of material that has been rolled over and had two opposite edges welded together. This leaves a weld bead 316 on one edge of the elbow, typically the outside edge, as shown in FIG. 4. Because of the strength that it lends to the construction, the weld bead extends throughout as much of the axial length of the elbow as is possible. Alternatively, the elbow members can be formed by securing two welded halves together.

It is to be understood that any number of straight members and elbow members in any orientation may be used to connect the air filter system with the intake manifold for fluid communication therebetween. That is, the present invention contemplates arrangements connecting an air filter system and an intake manifold in a variety of spatial orientations.

Elbow members engage straight members at joints or connector systems 215, 216, 217 and 218. One end of the conduit system 200 engages the air filter assembly at joint 219, and, at an opposite end, the air intake manifold, at joint 220. A description of connector system 215 follows, but it is to be understood that connector systems 216, 217, 218, 219 and 220 are substantially similar.

Referring now to a preferred embodiment of a single joint in greater detail, such a connector system 215 is shown in an exploded fashion in FIG. 5. Connector system 215 includes generally three portions clamped together. These are inner conduit 225, outer conduit 235, and elastomeric collar 245. Inner conduit 225 is analogous to straight tubular member 205 in FIG. 4 in the preferred embodiment, although a straight tubular member may also be a hollow conduit or may constitute the housing for an air filter. Outer conduit 235 is analogous to elbow member 211.

The outer surface 230 of inner conduit 225 is preferably of a generally constant diameter throughout the length of the conduit.

Outer conduit 235 has an inner surface 240 and an outer surface 241. Its end terminates in a bell or flared portion 242 with an inner diameter sized and shaped to receive inner conduit 225 and elastomeric collar 245, as will be described further below.

Elastomeric collar 245 has an inner end 246 and an opposite outer end 247, as well as an inner surface 249 and an outer surface 250. A plurality of ribs 255a–c extend from the elastomeric collar 245, generally at the collar's inner end 246. Each rib 255 extends generally circumferentially around the elastomeric collar 245. Adjacent ribs define a trough 256, as is shown in cross-section in FIG. 6.

The preferred collar 245 includes three ribs 255a–c that are generally pointed. With continued reference to FIG. 6, the outer end 247 includes a smooth seal section 258 with an outer diameter slightly greater than the diameter of the elastomeric collar taken at the bottom of a trough.

Figure 6:
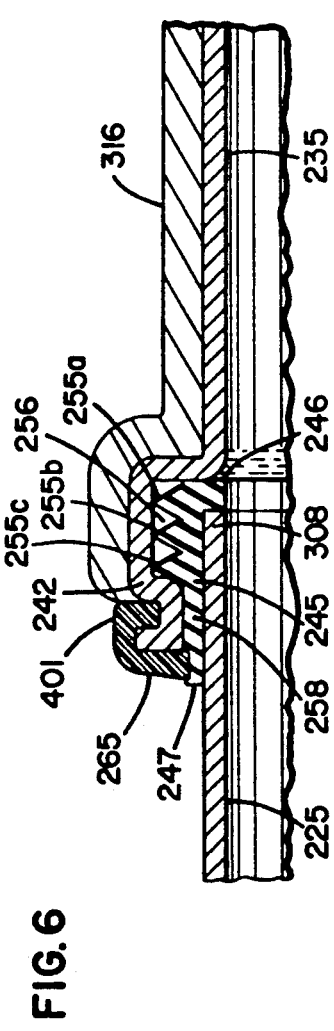
FIG. 6 is an enlarged, fragmentary view of a portion of one embodiment of a joint in the air conduit system of FIG. 4, taken along line 6—6.

Elastomeric collar 245 is sized and shaped to have a slightly larger distance between its inner and outer surfaces, at each point along its length, than the corresponding distance between the surfaces of the inner and outer conduits. Thus, due to the shape of the inner surface of the outer conduit, the portion of the collar 245 that includes ribs 255 is contained within an annular-shaped cavity, as shown in FIG. 6. Further, the elastomeric collar 245 is compressed between the inner and outer conduits when the system is assembled. In this manner, a seal is created between the conduits.

Axially, the collar 245 is sized so that its outer end and a portion of smooth section 258 extend some distance beyond the end of the outer conduit when the joint is assembled, as can be seen in FIG. 6. Additionally, the elastomeric collar is preferably sized so that its inner diameter is slightly less than the outer diameter of the inner conduit. This difference can be in the range of 8% on diameter.

Referring again to FIGS. 5 and 6, a clamp 265 is dimensioned to surround the exposed smooth seal section 258 of end 247 of collar 245 and squeeze the collar a predetermined amount. This compression can vary according to application, although compression in the range of 20-30% has been found preferable.

Once installed, the clamp 265 forces the exposed portion of the collar 245 into engagement with the inner conduit 225, thereby preventing the collar from moving with respect to the inner conduit in the longitudinal direction. The clamp is itself prevented from moving with respect to the collar by this same compression. Additionally, the compression from the clamp 265 also enhances the fluid-tight seal between the collar and the inner conduit.

The particular clamp 265 shown in FIG. 5 includes two mating halves 266 and 267, each with flanges 268 and 269 extending outwardly therefrom. Flanges 268 and 269 have mating apertures 270 and 271 for receiving nut and bolt arrangements 272 and 273, respectively.

FIG. 5b shows an alternate embodiment of a clamp 275, in which two mating semi-circular halves 277 and 278 are adapted to snap together. This clamp arrangement is advantageous because additional pieces, such as nuts and bolts, are not required to releasably attach the halves 277 and 278 to one another. Each half 277, 278 of clamp 275 includes two flanges 280, 281 extending radially outward from the ends of the halves. A tab 285 extends from flange 280 in a direction generally tangential to the half, and in a direction toward the mating half. Tab 285 has inner and outer faces 286 and 287, respectively. Outer face 287 includes one or more teeth 290 slanted away from the mating half. Flange 281 includes an aperture 293 adapted to receive and engage teeth 290. In the preferred embodiment, aperture 293 includes a notch (not shown) on which teeth 290 catch.

While only two clamp arrangements have been described above, it should be understood that modifications of these clamp arrangements are contemplated. For instance, the clamp need not be divided into half portions; rather, it is contemplated that portions of the clamp might comprise various other fractions of the circle defined by the clamp. Further, the clamp portions need not be entirely separable, as are the embodiments shown in FIGS. 5 and 5b. For instance, the clamp portions may be hinged together.

It is to be understood that both of the clamp arrangements shown are adapted to prevent the clamp from compressing the elastomeric seal member beyond a predetermined amount. Further, both of the clamp arrangements are adapted to prevent longitudinal or axial movement of one conduit with respect to the other. This will be discussed in greater detail below with reference to FIG. 9.

To assemble the joint, the elastomeric collar 245 is placed over the end of the inner conduit 225, thereby stretching the collar slightly. This stretching has the effect of enhancing the seal between the inner conduit and the collar. Moreover, it also places the collar on the conduit more firmly, so that the collar is less likely to move axially with respect to the inner conduit than would otherwise be the case.

This second advantage becomes particularly important during the next assembly step, in which the collar 245 and inner conduit 225 are forced into the flared portion 242 of the outer conduit 235. Because the collar is under compression when the joint is fully assembled, it requires some effort to achieve this insertion. The slight stretching of the collar around the inner conduit makes it less likely that the collar will move relative to the inner conduit during this operation.

This insertion force can be additionally lessened by sizing the ribs 255 on the collar so that they are compressed by an unequal amount. Particularly, in the preferred arrangement in which the collar has three pointed ribs, the rib 255a nearest the inner end 246 of the collar is compressed the least, while the rib 255c nearest the outer end 247 is compressed the most. In the most preferred arrangement, rib 255a is compressed about 0.050 inches; rib 255b is compressed about 0.075 inches; and the rib 255c is compressed about 0.100 inches when the arrangement is assembled. This variance may be effected by having the ribs extend different amounts in the radial direction outwardly from the outer surface 250 of the collar.

Flared portion 242 of outer conduit 235 has a back edge portion 308. The inner end 246 of the elastomeric collar is adapted to abut this back edge portion 308 when elastomeric collar member 245 is in place. Thus, one assembling the connector system 215 can be assured that the elastomeric collar member is appropriately positioned when the inner end 246 of the elastomeric collar member abuts the inside back edge portion 308 and can be inserted no further into the end of outer conduit 235. Alternatively, in arrangements in which it is necessary to adjust the length of the conduits, the elastomeric collar and the inner conduit can be inserted only a portion of the way into the outer conduit. That is, the sealing chamber 242 can be lengthened by not inserting the collar so far that it abuts the back edge portion 308 of the outer conduit. A gap of up to ¼" is frequently desired.

Once the inner conduit and collar have become fully inserted into the outer conduit, clamp 265 is placed around the exposed portion of the collar, thereby compressing it and securing it to the inner conduit in the manner described above.

To secure the collar 245 to the outer conduit 235, the present invention contemplates providing the outer surface 241 of outer conduit with a surface contour that receives a portion of the clamp 265. The contours of the clamp and outer conduit mate to lock the two parts together, thereby preventing the outer conduit from being withdrawn axially away from the clamp.

Figure 9:
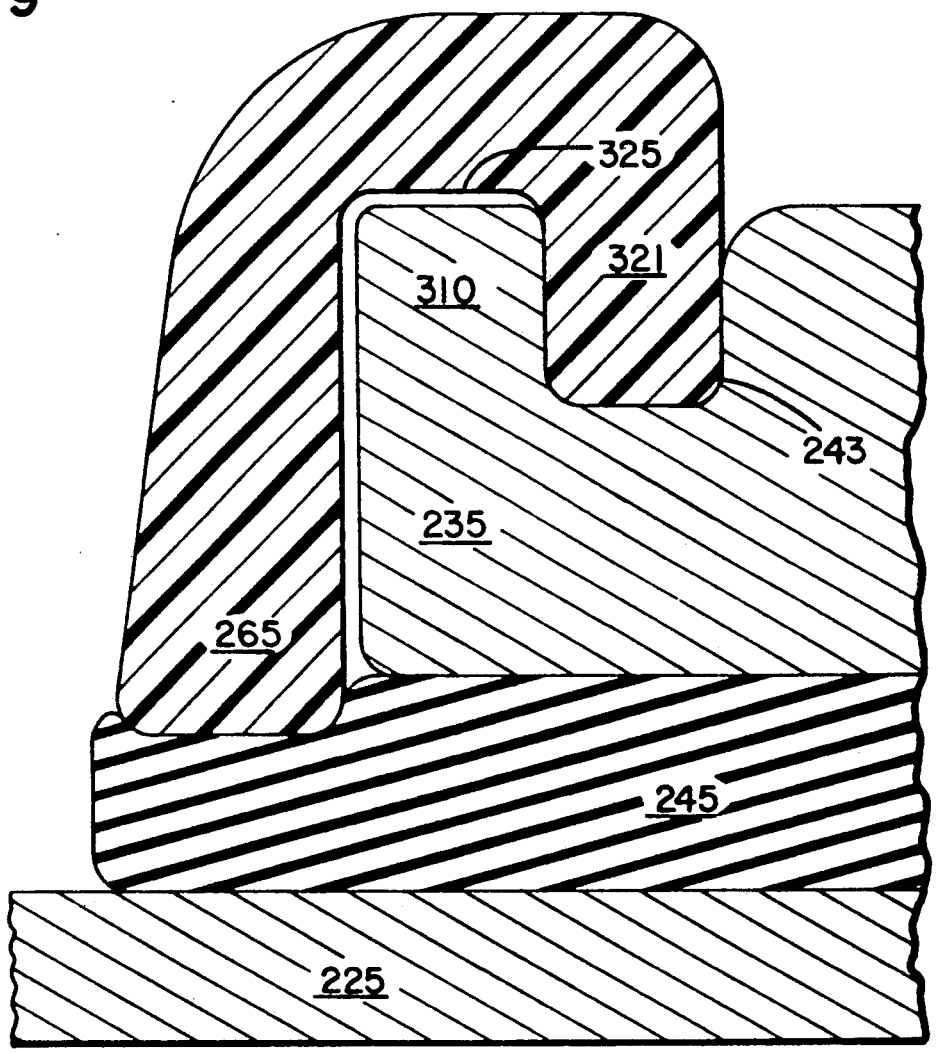
FIG. 9 is a much enlarged, fragmentary cross-sectional view of a portion of the joints shown in FIGS. 6, 7, and 8.

One such set of matching contours can be seen in enlarged detail in FIG. 9, in which a portion of an assembled joint is shown in cross-sectional detail. There, a channel 243 is provided near the end of outer conduit member 235. This channel, in combination with the otherwise constant outer diameter of the outer conduit, defines an outwardly extending lip 310 at the very end of the outer conduit.

Clamp 265 includes an inwardly extending lip 321, which is spaced axially from the rest of the clamp to form channel 325. This gives the clamp 265 a generally C-shaped cross-section, as shown.

The relative sizes and dimensions of these lips and channels are such that, when assembled, the lip 310 of the outer conduit is received in channel 325, while the lip 321 is received in the channel 243. In this way, the clamp captures the outer conduit 235 upon assembly.

In combination with the clamp's capture of the collar 245 and the inner conduit 225 via the compressional means described above, it can thus be readily seen that the embodiment here described provides a positive lock against axial movement of the inner conduit 225, collar 245, and outer conduit 245 with respect to each other.

Figure 8:
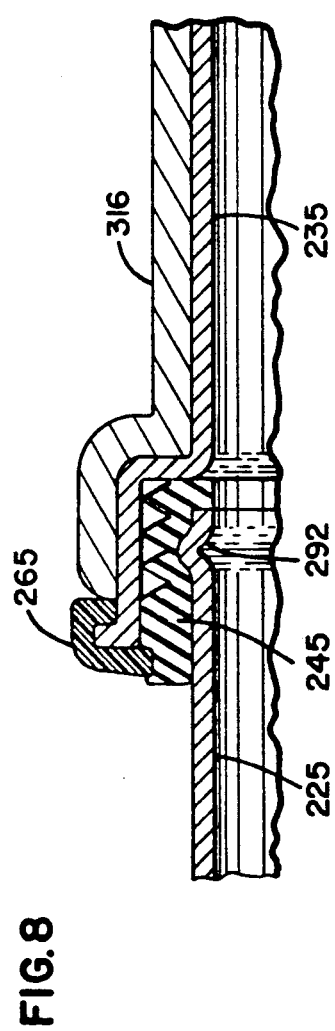
FIG. 8 is an enlarged, fragmentary view of another alternate embodiment of the joint shown in FIG. 6.

The surfaces of lip 321 and channel 243 can be designed, as shown in FIG. 9, to define a line-to-line fit with each other. This arrangement has the advantage of providing superior support for the material along each side of the seam of the outer conduit where that seam runs across the channel 243 and lip 310. This is particularly desirable because the dimensions of the lip and channel make it impossible for the weld bead 316 to extend any closer to the end of the outer conduit than the edge of channel 243, as is shown in FIG. 8.

Figure 10:
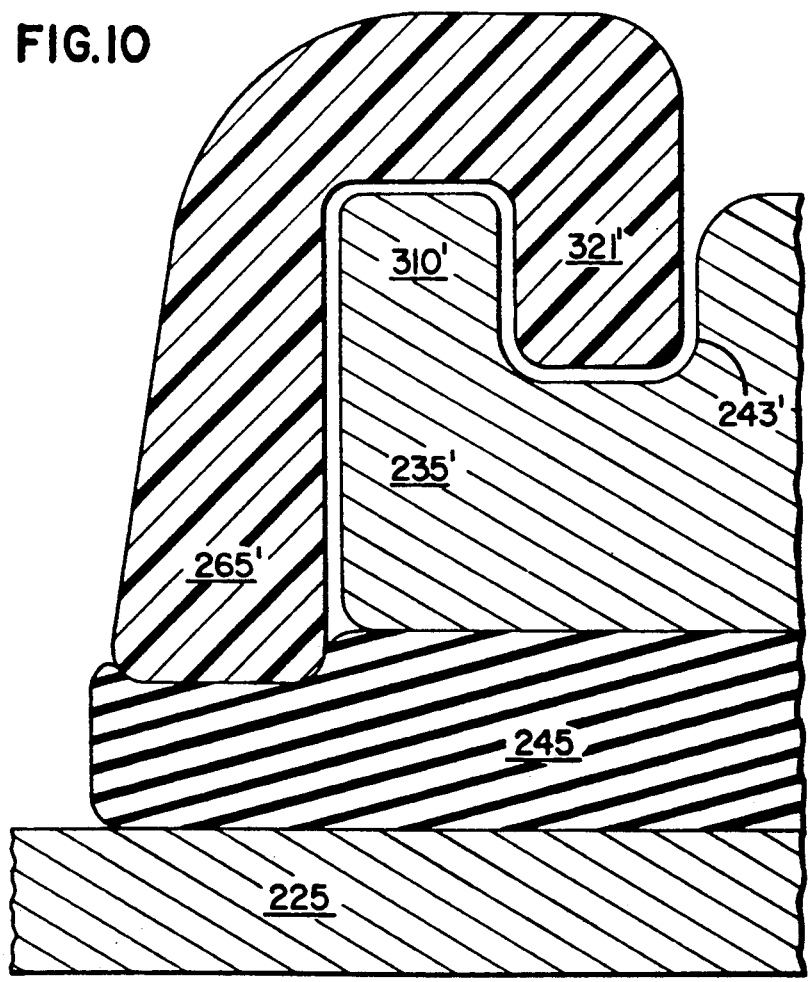
FIG. 10 is a much enlarged, fragmentary cross-sectional view of an alternate embodiment of a portion of the joints shown in FIGS. 6, 7, and 8.

Alternatively, the channel 243 and lip 321 can be sized to allow for a gap between them during nominal conditions. A cross-sectional illustration of this variation is shown in FIG. 10. When provided in combination with a similar nominal gap between the other surfaces of the clamp 265' and outer conduit 235', this alternative arrangement allows the joint to accommodate a greater range of motion between the inner and outer conduits. It has been found that, for these purposes, a nominal gap of 0.025" is preferable.

Figure 7:
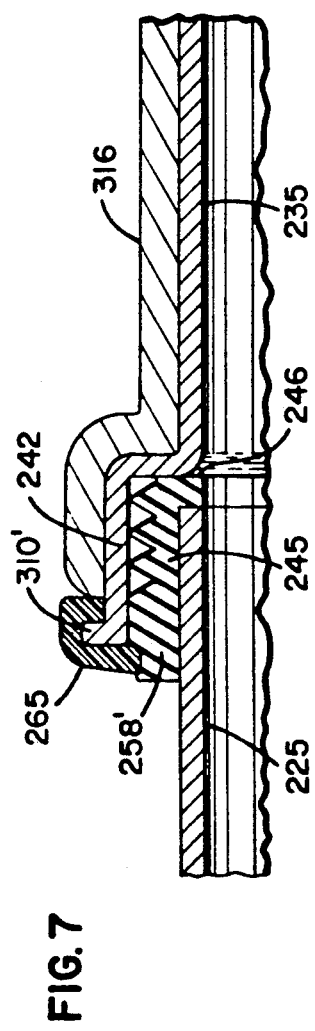
FIG. 7 is an enlarged, fragmentary view of an alternate embodiment of the portion of the joint shown in FIG. 6.

As a further alternative, the inner surface of the flared end 242 of the outer conduit can be made to have a uniform diameter throughout, as shown in FIG. 7. This uniform diameter can replace the inwardly-extending contour 401, shown, for example, in FIG. 6. Such a modification results in an even further reduction of the force required to insert the inner conduit and collar into outer conduit 235 during assembly.

In such an alternate embodiment as shown in FIG. 7, the smooth portion 258' of the collar is given a larger diameter until it is nearly as large as the diameter of at the tip of a rib 255. Further, lip 310 of FIG. 6 is enlarged in diameter, along with channel 243, until the channel disappears, and the lip becomes upstanding flange 310'. Corresponding changes in sizing and contour are made to clamp 265, to achieve either a nominal gap or a line-to-line fit, as desired.

As another alternative, the outer surface of the inner conduit can be provided with a bead 297 thereon, as illustrated in FIG. 8. Bead 297 aids in effecting a secure seal. In all other respects, the embodiments shown in FIGS. 7 and 8 are similar.

The conduit system 200 shown in FIGS. 4–10, in conjunction with connector system 215, is advantageous because it can fit, with a relatively small number of standard parts and minimal customizing, any spatial arrangement between the air filter assembly and the intake manifold of the engine. It does this by allowing straight sections of any convenient length to be used with standard connectors. Moreover, no special structure is necessary on the straight tubular members. By choosing straight tubular members of an appropriate length, and connecting them with elbow members using connector system 215, any spatial arrangement between an air filter and an intake manifold can be spanned.

The arrangement shown in FIGS. 4–10 is further advantageous because it achieves the most important design objectives. The sealing arrangement is sufficiently flexible because the inner and outer conduits are spaced from one another by the elastomeric collar, which allows the conduits to move relative to one another. At the same time, the arrangement has good resistance to collapse, since all the conduits are made of a relatively rigid material. Additionally, all these advantages occur without relying on a large compressive force from the clamp 265, thus keeping the stress on the components to a minimum. The assembled joint also has excellent resistance to axial separation.

It should be readily apparent that the inner conduit 225 could be made to be at the end of an elbow portion and the outer conduit 235 at the end of a straight tubular member. This embodiment is not preferred, largely because the straight tubular members of such a system cannot be as easily made by cutting down a straight tubular member of a standard length, thereby complicating matters of inventory. Such systems, however, would possess a number of the advantages that have been discussed herein.

Finally, it is to be understood that while certain embodiments of the present invention have been illustrated and described, the invention is not to be limited to the specific forms or arrangements of parts herein described and shown.

What is claimed is:

1. A connector system for joining two members of a fluid-transfer duct that approach each other from opposite directions, comprising:
    a first tubular member having at least one end;
    an elastomeric seal surrounding the outside of the end of the first tubular member;
    a second tubular member having at least one end, the end of the second tubular member surrounding the end of the first tubular member and a portion of the elastomeric seal, another portion of the elastomeric seal extending axially beyond the end of the second tubular member; and
    a clamp surrounding the portion of the elastomeric seal that extends beyond the end of the second tubular member, the clamp compressing the seal onto the first tubular member so as to form an interference fit between the seal and the first tubular member sufficient to prevent the first tubular member from being withdrawn axially from the seal, the clamp having means for non-compressibly engaging the second tubular member for preventing the second tubular member from being withdrawn from around the seal.

2. A connector system as defined in claim 1, wherein the compressed seal is still able to allow relative movement between the clamp and the first tubular member.

3. A connector system as defined in claim 2, wherein the clamp compresses the seal by 20–30 percent.

4. A connector system as defined in claim 3 wherein the clamp is comprised of two halves, each half with means to connect it to the other, so that the assembled clamp defines a perimeter of a particular size.

5. A connector system as defined in claim 1, wherein the end of the second tubular member has a first particular contour, and the clamp had a second particular contour, the first and second contours dimensioned so as to lock with each other when the clamp is installed over the elastomeric seal, to thereby prevent the second tubular member from being withdrawn axially away from the clamp.

6. A connector system as defined in claim 1, wherein the end of the second tubular member has an inner contour that is substantially cylindrical throughout the length of the end.

7. A connector system for joining two members of a fluid-transfer duct that approach each other from opposite directions, comprising:

a first tubular member having at least one end;

an elastomeric seal surrounding the outside of the end of the first tubular member;

a second tubular member having at least one end, the end of the second tubular member surrounding the end of the first tubular member and a portion of the elastomeric seal, another portion of the elastomeric seal extending axially beyond the end of the second tubular member, wherein the end of the second tubular member has an inner contour including a radially outwardly projecting lip and a cavity behind said lip, and wherein the seal has an outer contour matching an inner contour of the cavity and lip; and a clamp surrounding the portion of the elastomeric seal that extends beyond the end of the second tubular member, the clamp compressing the seal onto the first tubular member so as to form an interference fit between the seal and the first tubular member sufficient to prevent the first tubular member from being withdrawn axially from the seal, the clamp having means for engaging the second tubular member for preventing the second tubular member from being withdrawn from around the seal.

8. A connector system for joining two members of a fluid-transfer duct that approach each other from opposite directions, comprising:

a first tubular member having at least one end;

an elastomeric seal surrounding the outside of the ned of the first tubular member;

a second tubular member having at least one end, the end of the second tubular member surrounding the end of the first tubular member and a portion of the elastomeric seal, another portion of the elastomeric seal extending axially beyond the end of the second tubular member; and a clamp surrounding the portion of the elastomeric seal that extends beyond the end of the second tubular member, the clamp compressing the seal onto the first tubular member so as to form an interference fit between the seal and the first tubular member sufficient to prevent the first tubular member from being withdrawn axially from the seal, the clamp having means for engaging the second tubular member for preventing the second tubular member from being withdrawn from around the seal; wherein the end of the second tubular member has a first particular contour, and the clamp has a second particular contour, the first and second contours dimensioned so as to lock with each other when the clamp is installed over the elastomeric seal, to thereby prevent the second tubular member from being withdrawn axially away from the clamp; and wherein the clamp and second tubular member are dimensioned so that there is a gap between them at all points during nominal conditions.

9. A connector system as defined in claim 8 wherein the nominal gap between the clamp and the second tubular member is 0.025 inches.

10. A connector system for joining two members of a fluid-transfer duct that approach each other form opposite directions, comprising:

a first tubular member having at least one end;

an elastomeric seal surrounding the outside of the end of the first tubular member;

a second tubular member having at least one end, the end of the second tubular member surrounding the end of the first tubular member and a portion of the elastomeric seal, another portion of the elastomeric seal extending axially beyond the end of the second tubular member wherein the elastomeric seal has an outer surface with ribs extending therefrom, the ribs and the end of the second tubular member being dimensioned so that, when the system is assembled, the ribs are compressed by differing amounts; and a clamp surrounding the portion of the elastomeric seal that extends beyond the end of the second tubular member, the clamp compressing the seal onto the first tubular member so as to form an interference fit between the seal and the first tubular member sufficient to prevent the first tubular member from being withdrawn axially from the seal, the clamp having means for engaging the second tubular member for preventing the second tubular member from being withdrawn from around the seal.

* * * * *

UNITED STATES PATENT AND TRADEMARK OFFICE
CERTIFICATE OF CORRECTION

PATENT NO. : 5,137,308

DATED : August 11, 1992

INVENTOR(S) : Engel et al.

It is certified that error appears in the above-identified patent and that said Letters Patent is hereby corrected as shown below:

On the title page, item

[63], replace "Apr. 27, 1988" with --August 15, 1989--.

Column 1, line 10, replace "Apr. 27, 1988" with --August 15, 1989--.

Column 9, line 14, replace "had" with --has--.

Column 9, line 58, replace "ned" with --end--.

Column 10, line 32, replace "form" with --from--.

Signed and Sealed this

Twelfth Day of December, 1995

Attest:

BRUCE LEHMAN

*Attesting Officer*  Commissioner of Patents and Trademarks